(12) United States Patent
Cragun

(10) Patent No.: US 6,813,768 B1
(45) Date of Patent: Nov. 2, 2004

(54) METHOD AND SYSTEM FOR AUTOMATIC TASK FOCUS SWAPPING DURING BROWSER WAIT TIME

(75) Inventor: Brian John Cragun, Rochester, MN (US)

(73) Assignee: International Business Machines Corporation, Armonk, NY (US)

(*) Notice: Subject to any disclaimer, the term of this patent is extended or adjusted under 35 U.S.C. 154(b) by 935 days.

(21) Appl. No.: 09/025,155

(22) Filed: Feb. 18, 1998

(51) Int. Cl.[7] ............................................. G06F 9/46
(52) U.S. Cl. .................. 718/107; 718/108; 709/217; 709/203
(58) Field of Search ............................ 709/108, 107, 709/217–219, 201–203; 707/10, 9, 1; 718/107, 108

(56) References Cited

U.S. PATENT DOCUMENTS

| | | | | |
|---|---|---|---|---|
| 5,448,730 A | * | 9/1995 | Bakita et al. ............... | 395/650 |
| 5,737,619 A | * | 4/1998 | Judson ........................ | 395/761 |
| 5,778,372 A | * | 7/1998 | Cordell et al. .............. | 707/100 |
| 5,845,074 A | * | 12/1998 | Kobata ................... | 395/200.49 |
| 5,850,536 A | * | 12/1998 | McLain, Jr. ................ | 395/500 |
| 5,978,848 A | * | 11/1999 | Maddalozzo, Jr. et al. . | 709/227 |
| 5,996,007 A | * | 11/1999 | Klug et al. ................. | 709/218 |
| 6,011,537 A | * | 1/2000 | Slotznick ..................... | 345/115 |
| 6,046,762 A | * | 4/2000 | Sonesh et al. ................ | 348/16 |
| 6,609,146 B1 | * | 8/2003 | Slotznick ..................... | 709/200 |

OTHER PUBLICATIONS (Person) Person, Ron. "Using Windows 95" p. 24, 60, 1995.*
Provisional Application 60/065,457—Slotznick, Benjamin—Nov. 12, 1997.*

* cited by examiner

*Primary Examiner*—Lewis A. Bullock, Jr.
(74) *Attorney, Agent, or Firm*—Dillon & Yudell, LLP

(57) ABSTRACT

A method and system in a computer within a computer network for automatically swapping application tasks running within the computer when access from the computer to a remote network site is delayed. Initially, a link from a local network site to a remote network site utilizing a communications application while multi-tasking applications are simultaneously running at the local network site is initiated. Data retrieval from the remote network site is then initiated in response to initiating the link. Focus is then automatically switched from the communications application to a multi-tasking application simultaneously running at the local network site, in response to initiation of the data retrieval. After retrieval of the data has been completed, user notification of such completion is automatically provided. In one embodiment, that notification is provided by automatically switching focus back to the communications program.

21 Claims, 10 Drawing Sheets

METHOD AND SYSTEM FOR AUTOMATIC TASK FOCUS SWAPPING DURING BROWSER WAIT TIME

BACKGROUND OF THE INVENTION

1. Technical Field

The present invention relates in general to improved information processing systems. In particular, the present invention relates to multiple networks in which information processing systems are utilized. Still more particularly, the present invention relates to an improved browser method and system. Still more particularly, the present invention relates to an improved method and system for automatic task focus swapping during browser wait time.

2. Description of the Related Art

The development of computerized distributed information resources, such as the "Internet," allows users to link with servers and networks, and thus retrieve vast amounts of electronic information heretofore unavailable in an electronic medium. Such electronic information increasingly is displacing more conventional techniques of information transmission, such as newspapers, magazines, and even television. The term "Internet" is an abbreviation for "Internetwork," and refers commonly to a collection of computer networks that utilize the TCP/IP suite of protocols, well-known in the art of Computer networking. TCP/IP is an acronym for "Transport Control Protocol/Internet Protocol," a software protocol developed by the Department of Defense for communication between computers.

Electronic information transferred between computer networks (e.g., the Internet) can be presented to a user in hypertext, a metaphor for presenting information in a manner in which text, images, sounds, and actions become linked together in a complex non-sequential web of associations that permit the user to "browse" through related topics, regardless of the presented order of the topics. These links are often established by both the author of a hypertext document and by the user, depending on the intent of the hypertext document. For example, traveling among hypertext links to the word "iron" in an article displayed within a graphical user interface in a computer system might lead the user to the periodic table of the chemical elements (i.e., linked by the word "iron"), or to a reference to the use of iron in weapons in Europe in the Dark Ages. The term "hypertext" is utilized to describe documents, as presented by a computer, that express the nonlinear structure of ideas, as opposed to the linear format of books, film, and speech.

Hypertext, especially in an interactive format where choices are controlled by the user, is structured around the idea of offering a working and learning environment that parallels human thinking—that is, an environment that allows the user to make associations between topics rather than moving sequentially from one topic to the next, as in an alphabetic list. Hypertext topics are linked in a manner that allows users to jump from one subject to other related subjects during a search for information.

Networked systems utilizing hypertext conventions typically follow a client/server architecture. A "client" is a member of a class or group that utilizes the services of another class or group to which it is not related. In the context of a computer network such as the Internet, a client is a process (i.e., roughly a program or task) that requests a service provided by another program. The client process utilizes the requested service without having to "know" any working details about the other program or the service itself.

In networked systems, a client is usually a computer that accesses shared network resources provided by another computer (i.e., a server).

A "server" is typically a remote computer system accessible over a communications medium such as the Internet. The server scans and searches for raw (e.g., unprocessed) information sources (e.g., newswire feeds or newsgroups). Based upon such requests by the user, the server presents filtered electronic information to the user as server responses to the client process. The client process may be active in a first computer system, and the server process may be active in a second computer system, and communicate with one another over a communications medium that allows multiple clients to take advantage of the information-gathering capabilities of the server.

Client and server communicate with one another utilizing the functionality provided by a hypertext transfer protocol (HTTP). The World Wide Web (WWW) or, simply, the "web," includes all servers adhering to this protocol, which are accessible to clients via a Universal Resource Locator (URL). Internet services can be accessed by specifying Universal Resource Locators that have two basic components: a protocol to be used and an object pathname. For example, the Universal Resource Locator address, "http://www.uspto.gov" (i.e., the "home page" for the U.S. Patent and Trademark Office), specifies a hypertext transfer protocol ("http") and a pathname of the server ("www.uspto.gov"). The server name is associated with a unique numeric value (TCP/IP address). Active within the client is a first process, known as a "browser," that establishes the connection with the server and presents information to the user. The server itself executes corresponding server software that presents information to the client in the form of HTTP responses. The HTTP responses correspond to "web pages" constructed from a Hypertext Markup Language (HTML), or other server-generated data.

A "web page" (also referred to by some designers simply as a "page") is a data file written in a hyper-text language that may have text, graphic images, and even multimedia objects such as sound recordings or moving video clip s associated with that data file. The web page can be displayed as a viewable object within a computer system. A viewable object can contain one or more components such as spreadsheets, text, hotlinks, pictures, sound, and video objects. A web page can be constructed by loading one or more separate files into an active directory or file structure that is then displayed as a viewable object within a graphical user interface.

When a client workstation sends a request to a server for a web page, the server first transmits (at least partially) the main hypertext file associated with the web page, and then loads, either sequentially or simultaneously, the other files associated with the web page. A given file may be transmitted as several separate pieces via TCP/IP protocol. The constructed web page is then displayed as a viewable object on the workstation monitor. A webpage may be "larger" than the physical size of the monitor screen , and devices such as graphical user interface scroll bars can be utilized by the viewing software (i.e., the browser) to view different portions of the web page.

A problem associated with the transmission of hypertext files, web pages, and other server data to local network sites or client workstations is the period of time involved in waiting for this data to be transferred and displayed for utilization by the user. Browsing the web requires a great deal of waiting. The user may perform other tasks while waiting. However, it is cumbersome to switch between tasks running simultaneously within the local network site or client workstation when data is being transferred from the remote network site or server. Those skilled in the computer arts will appreciate that a user simply can swap back and forth between applications during browser wait periods, or an "edit" session may be displayed along side the browser session.

However, such methods are cumbersome on smaller displays. On a small display, if the browser is covered, the user cannot discern appropriately when data has been completely transferred to the local network site or client workstation from the remote network site (i.e, the server). Also, there is no readily available method of selecting the browser if the user is unaware that the data has been successfully transferred. If searching the web is a primary activity at the moment, the user may be distracted at the secondary activity and not realize that a particular web page is ready for display. In addition, when displayed side by side, the "fill-in" of the web page can be distracting as the user works on a secondary task.

Based on the foregoing, it can be appreciated that a need exists for a method and system which would automatically swap back and forth between applications during browser wait periods. Such a method and system would immediately inform and assist the user in turning to the priority task at hand as soon as it is available.

SUMMARY OF THE INVENTION

It is therefore one object of the present invention to provide for an improved browser method and system.

It is therefore another object of the present invention to provide an improved information processing system.

It is yet another object to provide improved method and system for automatic task focus swapping during browser wait time.

The above and other objects are achieved as is now described. A method and system in a computer within a computer network are disclosed for automatically swapping application tasks running within the computer when access from the computer to a remote network site is delayed. Initially, a link from a local network site to a remote network site utilizing a communications application while multi-tasking applications are simultaneously running at the local network site is initiated. Data retrieval from the remote network site is then initiated, in response to initiating the link. Focus is then automatically switched from the communications application to a multi-tasking application simultaneously running at the local network site, in response to initiation of the date retrieval. In response to completion of the data retrieval, user notification of such completion is automatically provided.

In one embodiment, that notification is provided by automatically switching focus back to the communications programs. In addition, focus may be automatically switched back to the communications application from the multi-tasking application after expiration of a predetermined time period. Distinction may be made between time-consuming links and immediate links. In such a case, a determination is made whether the link invoked is a time-consuming link or an immediate link, and focus is automatically switched to a multi-tasking application simultaneously running at the network site, in response to completion of the data retrieval, only if the link comprises a time-consuming link. However, if the link is an immediate link, focus remains within the communications application retrieving data from the remote network site. The communications application may be implemented as a browser application.

BRIEF DESCRIPTION OF THE DRAWINGS

The novel features believed characteristic of this invention are set forth in the appended claims. The invention itself, however, as well as a preferred mode of use, further objects, and advantages thereof, will best be understood by reference to the following detailed description of a preferred embodiment when read in conjunction with the accompanying drawings, wherein:

DETAILED DESCRIPTION OF PREFERRED EMBODIMENT

Figure 1:
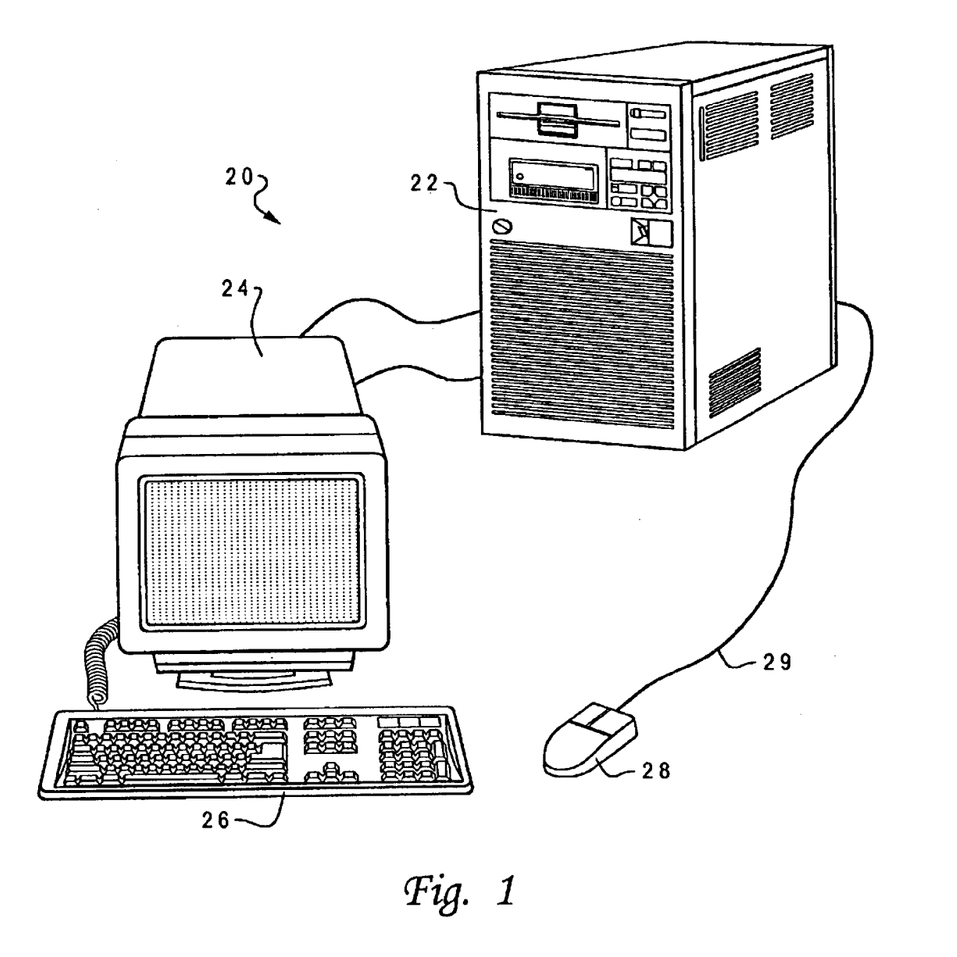
FIG. 1 illustrates a pictorial representation of a computer system which may be utilized to implement a preferred embodiment of the present invention.

With reference now to the figures and in particular with reference to FIG. 1, there is depicted a pictorial representation of a computer system in accordance with a preferred embodiment of the present invention. A computer system 20 is depicted that includes a system unit 22, a video display terminal 24, a keyboard 26, and a mouse 28. Computer 20 can be implemented utilizing any suitable computer, such as an IBM Aptiva™ computer, a product of International Business Machines Corporation, located in Armonk, N.Y. "Aptiva" is a trademark of International Business Machines Corporation. However, those skilled in the art will appreciate that a preferred embodiment of the present invention can apply to any computer system, regardless of whether the computer system is a complicated multi-user computing apparatus or a single-user workstation.

Keyboard 26 is that part of computer system 20 that resembles a typewriter keyboard and which enables a user to control particular aspects of the computer. Because information flows in one direction, from keyboard 26 to system unit 22, keyboard 26 functions as an input-only device. Functionally, keyboard 26 represents half of a complete input/output device, the output half being video display terminal 24. Keyboard 26 includes a standard set of printable characters presented in a QWERTY pattern typical of most typewriters. In addition, keyboard 26 includes a calculator-like numeric keypad at one side. Some of these keys, such as the "control," "alt," and "shift" keys can be utilized to change the meaning of another key. Other special keys and combinations of keys can be utilized to control program operations or to move either text or cursor on the display screen of video display terminal 24.

Figure 2:
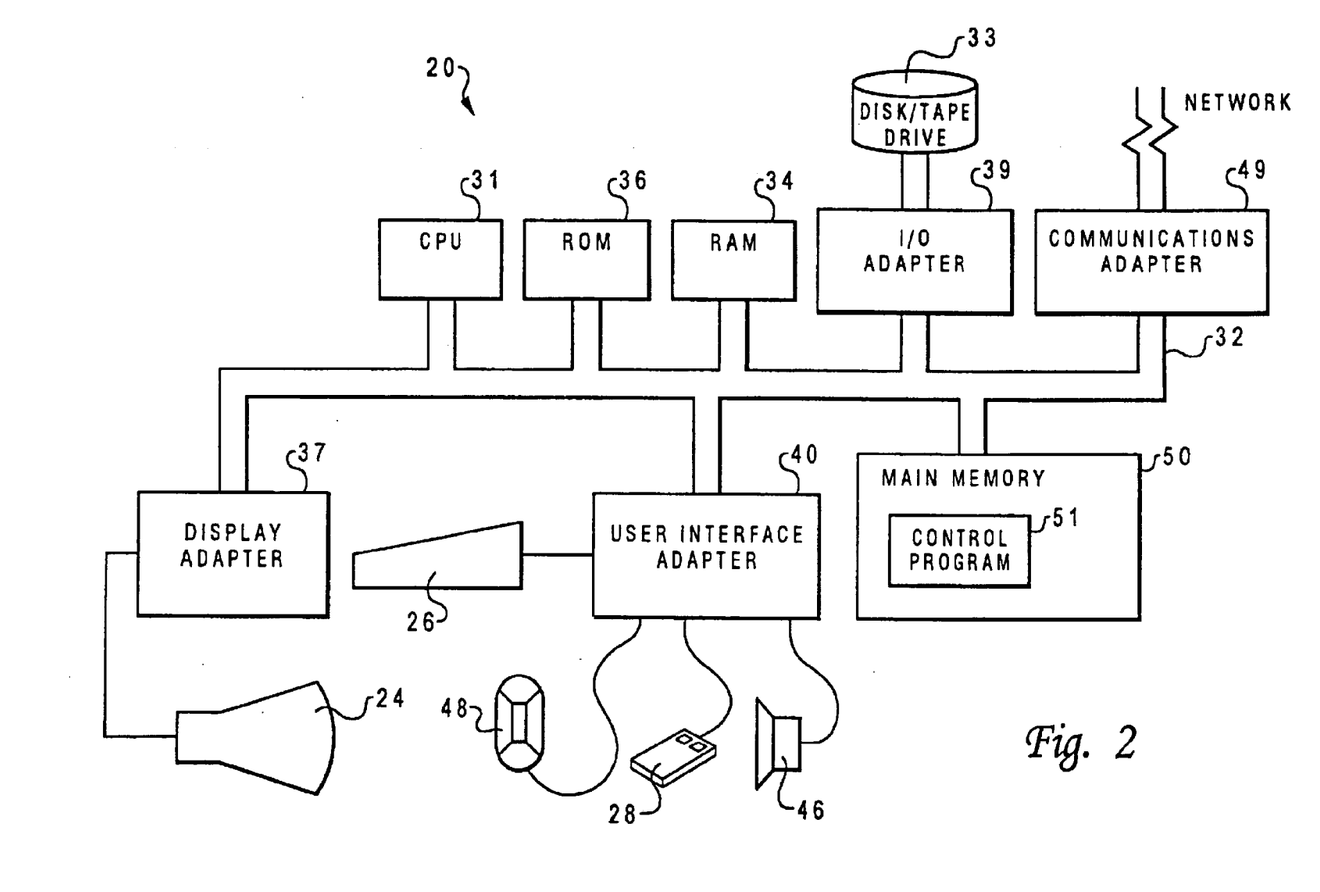
FIG. 2 depicts a representative hardware environment of the computer system illustrated in FIG. 1.

In FIG. 1 and FIG. 2, like parts are identified by like numbers. Computer system 20 is thus a configuration that includes all functional components of a computer and its associated hardware. In general, a typical computer system includes a console or system unit such as system unit 22, with one or more disk drives, a monitor such as video display terminal 24, and a keyboard such as keyboard 26. Additional hardware, often referred to in the art as peripheral devices, can include devices such as printers, modems, and joysticks.

FIG. 2 depicts a representative hardware environment of the computer system illustrated in FIG. 1. Computer system 20 includes a Central Processing Unit ("CPU") 31, such as a conventional microprocessor, and a number of other units interconnected via system bus 32. CPU 31 includes a portion of computer system 20 that controls the operation of the entire computer system, including executing the arithmetical and logical functions contained in a particular computer program. Although not depicted in FIG. 2, CPUs such as CPU 31 typically include a control unit that organizes data and program storage in a computer memory and transfers the data and other information between the various parts of the computer system. Such CPUs also generally include an arithmetic unit that executes the arithmetical and logical operations, such as addition, comparison, multiplications and so forth. Such components and units of computer system 20 can be implemented in a system unit such as system unit 22 of FIG. 1.

Computer system 20 further includes random-access memory (RAM) 34, read-only memory (ROM) 36, display adapter 37 for connecting system bus 32 to video display terminal 24, and I/O adapter 39 for connecting peripheral devices (e.g., disk and tape drives 33) to system bus 32. RAM 34 is a type of memory designed such that the location of data stored in it is independent of the content. Also, any location in RAM 34 can be accessed directly without having to work through from the beginning. ROM 36 is a type of memory that retains information permanently and in which the stored information cannot be altered by a program or normal operation of a computer.

Video display terminal 24 displays the visual output of computer system 20. Video display terminal 24 can be a cathode-ray tube (CRT) based video display well-known in the art of computer hardware. However, with a portable or notebook-based computer, video display terminal 24 can be replaced with a liquid crystal display (LCD) based or gas plasma-based flat-panel display. Computer system 20 further includes user interface adapter 40 for connecting keyboard 26, mouse 28, speaker 46, microphone 48, and/or other user interface devices, such as a touch-screen device (not shown), to system bus 32. Communications adapter 49 connects computer system 20 to a computer network. Although computer system 20 is shown to contain only a single CPU and a single system bus, it should be understood that the present invention applies equally to computer. systems that have multiple CPUs and to computer systems that have multiple buses that each perform different functions in different ways.

Computer system 20 also includes an interface that resides within a machine-readable media to direct the operation of computer system 20. Any suitable machine-readable media may retain the interface, such as RAM 34, ROM 36, a magnetic diskette, magnetic tape, or optical disk (the last three being located in disk and tape drives 33). Any suitable operating system and associated interface (e.g., Microsoft Windows) may direct CPU 31. For example, the AIX operating system and AIXwindows windowing system can direct CPU 31. The AIX operating system is IBM's implementation of the UNIX operating system. UNIX is a trademark of UNIX Systems Laboratories, Inc. Other technologies also can be utilized in conjunction with CPU 31, such as touch-screen technology or human voice control. Operating systems typically include computer software for controlling the allocation and usage of hardware resources such as memory, CPU time, disk space, and peripheral devices. The operating system is the foundation upon which applications, such as word-processing, spreadsheet, and web browser programs are built.

Those skilled in the art will appreciate that the hardware depicted in FIG. 2 may vary for specific applications. For example, other peripheral devices such as optical disk media, audio adapters, or chip programming devices, such as PAL or EPROM programming devices well-known in the art of computer hardware and the like, may be utilized in addition to or in place of the hardware already depicted. In addition, main memory 50 is connected to system bus 32, and includes a control program 51. Control program 51 resides within main memory 50, and contains instructions that, when executed on CPU 31, carries out the operations depicted in the logic flowchart of FIG. 7 and FIG. 8 described herein. The computer program product also can be referred to as a program product. Control program 51 contains instructions that when executed on CPU 31 can carry out logical operations such as those operations depicted in the logic flow charts of FIG. 7 and FIG. 8 described herein.

It is important to note that, while the present invention has been (and will continue to be) described in the context of a fully functional computer system, those skilled in the art will appreciate that the present invention is capable of being distributed as a program product in a variety of forms, and that the present invention applies equally regardless of the particular type of signal-bearing media utilized to actually carry out the distribution. Examples of signal-bearing media include: recordable-type media, such as floppy disks, hard disk drives, and CD ROMs, and transmission-type media such as digital and analog communication links. Examples of transmission media include devices such as modems. Modems are communication devices that enable computers such as computer system 20 depicted in FIG. 1 and FIG. 2 to transmit information over standard telephone lines.

Figure 3:
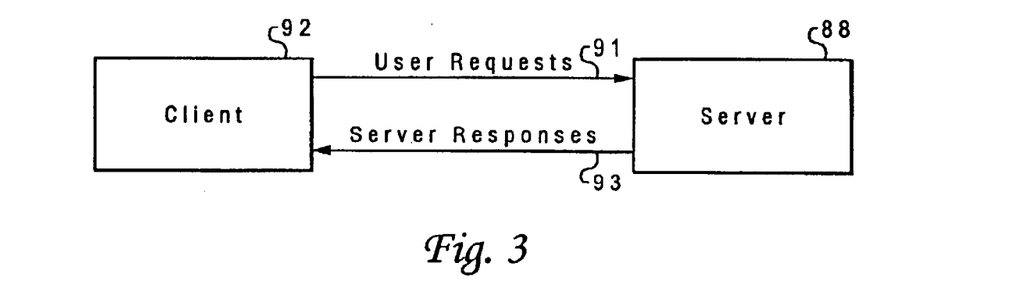
FIG. 3 illustrates a block diagram illustrative of a client/server architecture in accordance with a preferred embodiment of the present invention.
Figure 4:
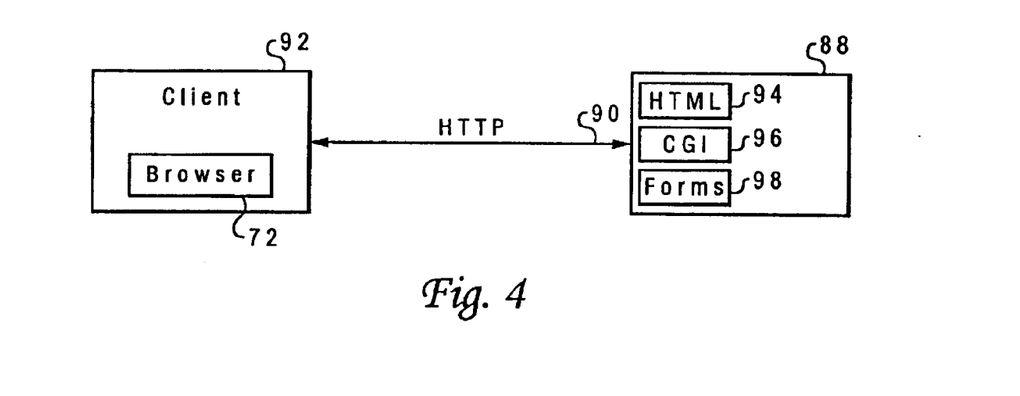
FIG. 4 depicts a detailed block diagram of a client/server architecture in accordance with a preferred embodiment of the present invention.
Figure 5:
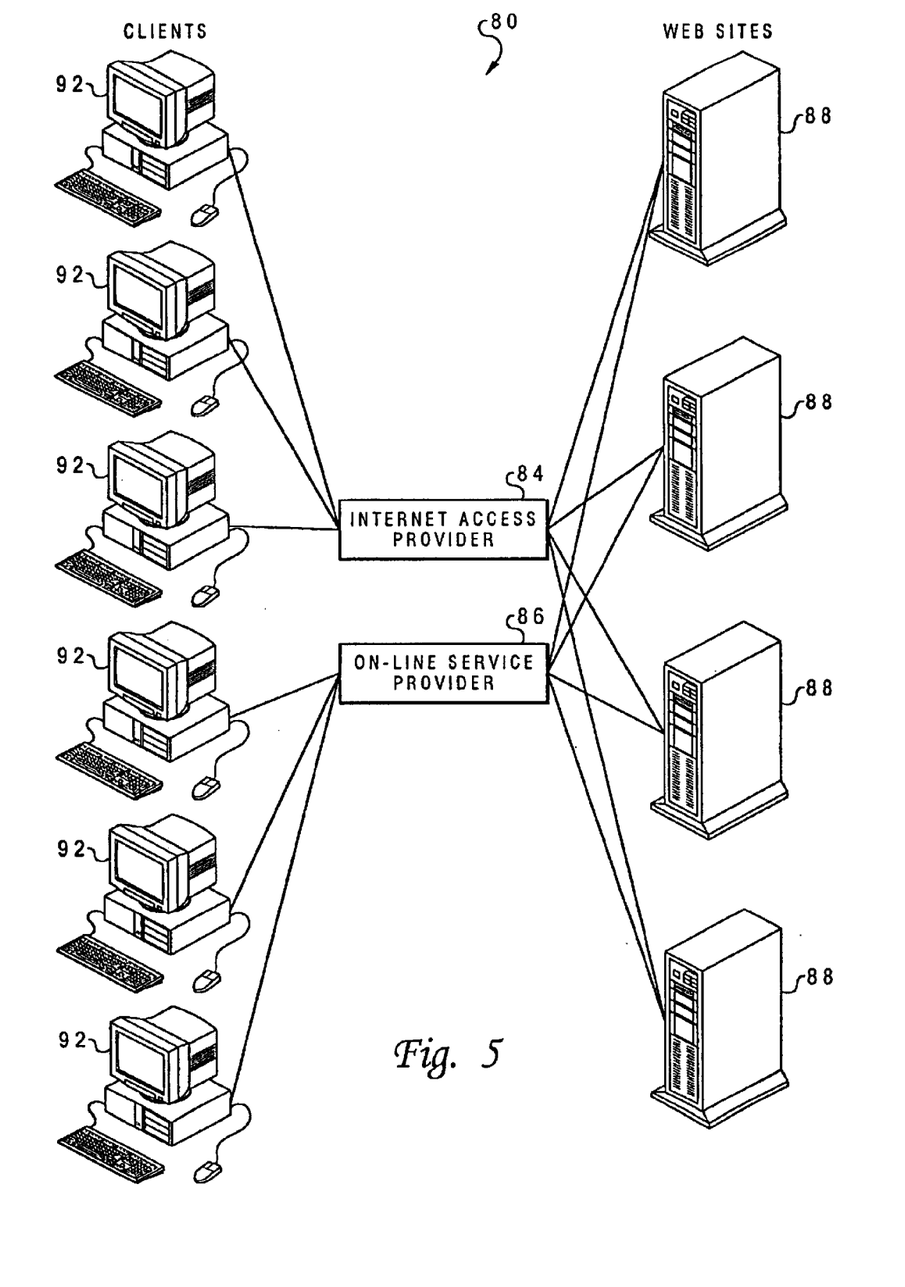
FIG. 5 is a diagram illustrative of a computer network which can be implemented in accordance with a preferred embodiment of the present invention.

In the illustrations depicted in FIG. 3, FIG. 4, and FIG. 5, like parts are indicated by like reference numerals. FIG. 3 illustrates a block diagram illustrative of a client/server architecture in accordance with a preferred embodiment of the present invention. In FIG. 3, user requests 91 for news are sent by a client application program 92 to a server 88. Server 88 can be a remote computer system accessible over the Internet or other communication networks. Client application program 92 may be utilized with computer 20 of FIG. 1 and the implementation of computer 20 illustrated in FIG.

2. Server 88 performs scanning and searching of raw (e.g., unprocessed) information sources (e.g., newswire feeds or newsgroups) and, based upon these user requests, presents the filtered electronic information as server responses 93 to the client process. The client process may be active in a first computer system, and the server process may be active in a second computer system, communicating with one another over a communications medium, thus providing distributed functionality and allowing multiple clients to take advantage of the information-gathering capabilities of the server.

FIG. 4 illustrates a detailed block diagram of a client/server architecture in accordance with a preferred embodiment of the present invention. Although the client and server are processes that are operative within two computer systems, these processes being generated from a high-level programming language (e.g., PERL), which is interpreted and executed in a computer system at runtime (e.g., a workstation), it can be appreciated by one skilled in the art that they may be implemented in a variety of hardware devices, either programmed or dedicated.

Client 92 and server 88 communicate by utilizing the functionality provided by HITP. Active within client 92 is a first process, browser 72, which establishes connections with server 88, and presents information to the user. Any number of commercially or publicly available browsers can be utilized in various implementations in accordance with the preferred embodiment of the present invention. For example, a browser such as Netscape™ can be utilized in accordance with a preferred embodiment of the present invention to provide the functionality specified under HTTP. "Netscape" is a trademark of Netscape, Inc.

Server 88 executes the corresponding server software, which presents information to the client in the form of HTTP responses 90. The HTTP responses 90 correspond with the web pages represented utilizing HTML, or other data generated by server 88. Server 88 provides HTML 94. Under certain browsers, a Common Gateway Interface (CGI) 96 is also provided, which allows the client program to direct server 88 to commence execution of a specified program contained within server 88. This may include a search engine that scans received information in the server for presentation to the user controlling the client. Utilizing this interface, and HTTP responses 90, the server may notify the client of the results of that execution upon completion. Common Gateway Interface (CGI) 96 is one form of a gateway, a device utilized to connect dissimilar networks (i.e., networks utilizing different communications protocols) so that electronic information can be passed from one network to the other. Gateways transfer electronic information, converting such information to a form compatible with the protocols utilized by the second network for transport and delivery.

In order to control the parameters of the execution of this server-resident process, the client may direct the filling out of certain "forms" from the browser. This is provided by the "fill-in-forms" functionality (i.e., forms 98), which is provided by some browsers. This functionality allows the user via a client application program to specify terms in which the server causes an application program to function (e.g., terms or keywords contained in the types of stories/articles which are of interest to the user). This functionality is an integral part of the search engine.

FIG. 5 is a diagram illustrative of a computer network 80, which can be implemented in accordance with a preferred embodiment of the present invention. Computer network 80 is representative of the Internet, which can be described as a known computer network based on the client-server model discussed herein. Of course, those skilled in the art will appreciate that the Internet is not the only distributed computer network that may be utilized in accordance with a preferred embodiment of the present invention. Other distributed computer networks such as the so-called "intranets" well known in the art of computer networking can also be utilized to implement computer network 80. Conceptually, the Internet includes a large network of servers 88 that are accessible by clients 92, typically users of personal computers, through some private Internet access provider 84 (e.g., such as Internet America) or an on-line service provider 86 (e.g., such as America On-Line, Prodigy, Compuserve, and the like). Each of the clients 92 may run a browser to access servers 88 via the access providers. Each server 88 operates a so-called "web site" that supports files in the form of documents and pages. A network path to servers 88 is identified by a Universal Resource Locator (URL) having a known syntax for defining a network collection.

Figure 6:
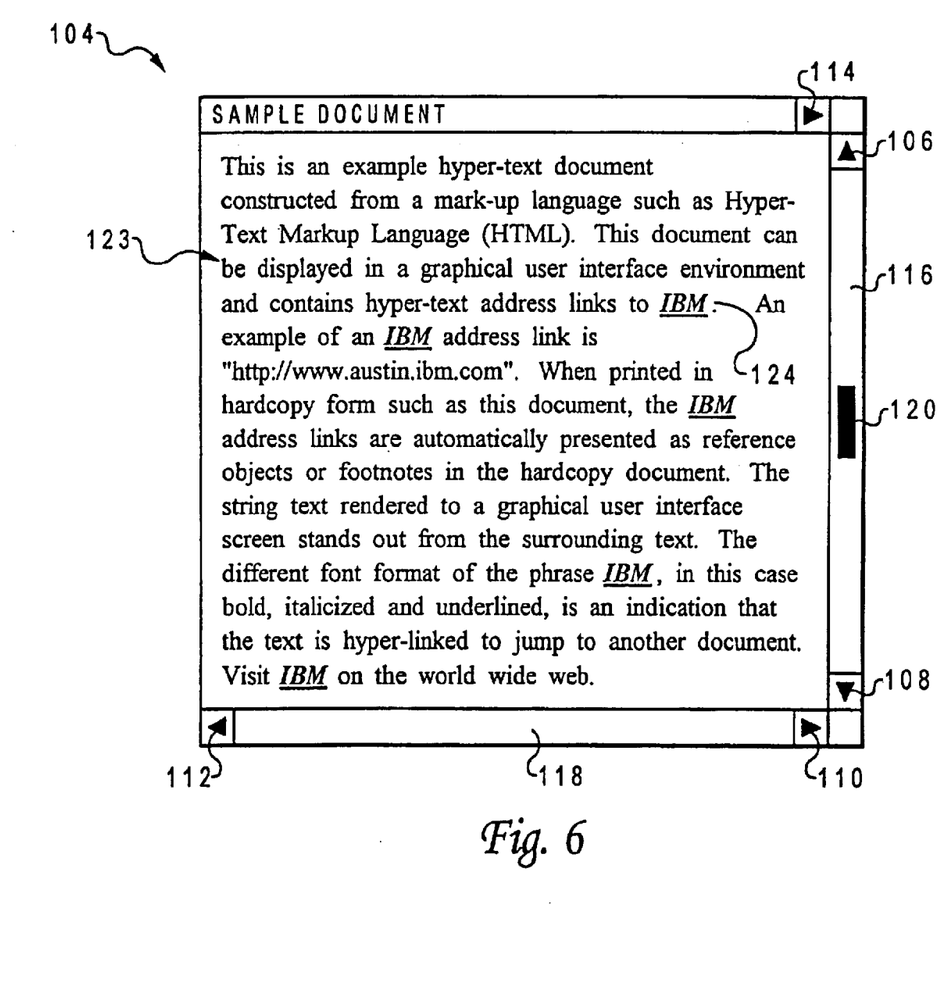
FIG. 6 illustrates an example hypertext document contained within a graphical user interface window and which can be utilized in accordance with the method and system of the present invention.

FIG. 6 illustrates an example hypertext document 123 contained within a graphical user interface window 104, which can be utilized in accordance with a preferred embodiment of the present invention. Note that a graphical user interface is a type of display format that enables the user to choose commands, start programs, and see lists of files and other options by pointing to pictorial representations (i.e., icons) and lists of menu items on the screen (i.e., monitor screen). Choices can generally be activated with a keyboard or a mouse. Window 104 displays a portion of a viewable object (i.e., hypertext document 123) constructed from a mark-up language. One such mark-up language that can be utilized in accordance with the example presented in FIG. 6, is the Hypertext Mark-up Language (HTML). The size and position of elevator 120 within scroll bar 116 corresponds to the size and position of the current viewable page in relation to hypertext document 123. Hypertext document 123 can be accessed from a computer system contained within a computer network such as the Internet.

In the example of FIG. 6, because hypertext document 123 includes too many pages to view simultaneously, the user can position a mouse cursor over up-arrow section 106 or down-arrow section 108 of scroll bar 116 and click a pointing device (e.g., a mouse) to scroll the hypertext document 123 upward or downward, as appropriate. A vertical scroll bar 118 includes arrow sections 112 and arrow sections 110 for scrolling hypertext document 123 respectively left or right. Also, an optional arrow section 114 allows a user to scroll the document right Thus, the graphical user interface that contains window 104 and hypertext document 123 is a type of computer display format that enables a user to choose commands, start programs, and see lists of files and other options by pointing to pictorial representations (i.e., icons) and lists of menu items on the screen. Choices can generally be activated either with a keyboard or a mouse.

Hypertext document 123 contains specific string text 124 rendered on the screen by the graphical user interface to stand out from the surrounding text. String text 124 is rendered in a different format. In the example of FIG. 6, string text 124 is rendered as IBM. The different font format of string text 124 is an indication that the text is hyper-linked to "jump" to another document When a user clicks on string text 124 with a mouse or other pointing device, the graphical user interface replaces the presently viewed hypertext document 123 with the hyper-linked document.

FIG. 7(*a*) is a flow diagram 140*a* that shows general steps that can be utilized to carry out the method and system, according to a preferred embodiment of the present invention. FIG. 7(a), FIG. 7(b), FIG. 7(c) and FIG. 7(d) are meant to be interpreted together. The flow charts presented herein are related to one another. It can be appreciated by those skilled in the art that FIG. 7(a), FIG. 7(b), FIG. 7(c) and FIG. 7(d) present a self-consistent sequence of steps leading to a desired result. The steps are those requiring physical manipulation of physical quantities. Usually, although not necessarily, these quantities take the form of electrical or magnetic signals capable of being stored, transferred, combined, compared, and otherwise manipulated. It has proven convenient at times by those skilled in the art, to refer to these signals as bits, values, elements, symbols, characters, terms, numbers, or the like. It should be borne in mind, however, that all of these and similar terms are to be associated with the appropriate physical quantities and are merely convenient labels applied to these quantities.

Further, the manipulations performed are often referred to in terms, such as "initiating" or "retrieving," which are commonly associated with mental operations performed by a human operator. No such capability of a human operator is necessary or desirable in most cases in any of the operations described herein which form part of the present invention; the operations are machine operations. Useful machines for performing operations of a preferred embodiment of the present invention include data-processing systems such as general purpose digital computers or other similar devices. In all cases the distinction between the method operations in operating a computer and the method of computation itself should be borne in mind. The present invention relates to method steps for operating a computer, such as computer system 20 of FIG. 1 and FIG. 2, in processing electrical or other (e.g. mechanical, chemical) physical signals to generate other desired physical signals.

Figure 7A:
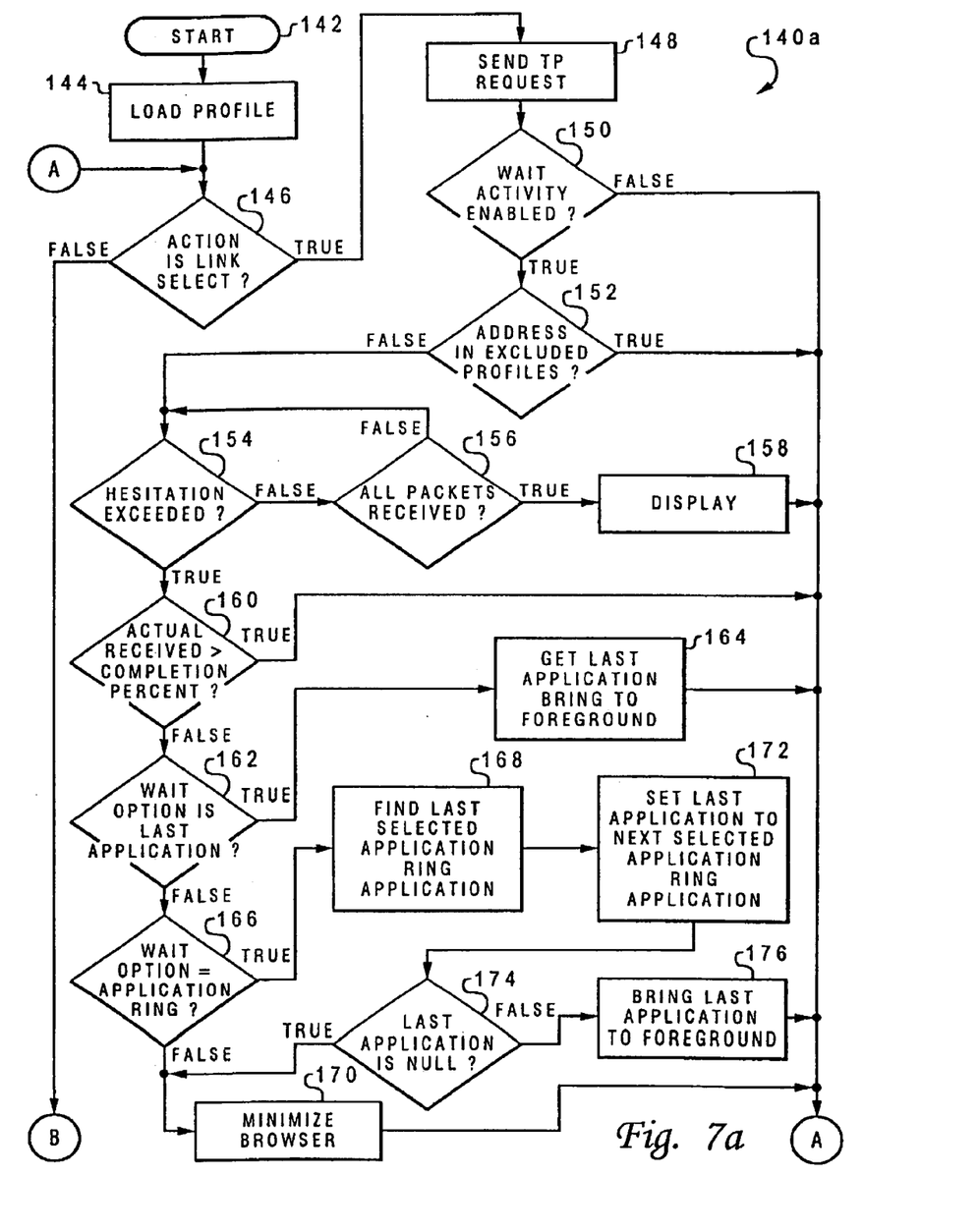
FIG. 7(a) depicts a flow diagram that shows general steps utilized to carry out the method and system, according to a preferred embodiment of the present invention.

Thus, as depicted at block 142, the process is initiated. As illustrated block at 144, a profile is loaded. A profile includes data that describes significant characteristics of a user, a group of users, or one or more computer resources. As depicted at block 146, a decision operation is performed leading to two choices. If an action performed results in the selection of a link (e.g., hypertext link as described herein), then as described at block 148 a "tp" request is sent from the server to the local network site or client workstation. A "tp" request is a transfer protocol request, which is part of HTTP responses 90 depicted in FIG. 4. If the action does not result in the selection of a link, then the process continues to block B, as elaborated in FIG. 7(b). As illustrated at block 150, if a wait activity is enabled then the process continues. However, if a wait activity is not enabled, then the process returns to block A. The operation performed at block A continues after the profile is loaded, as described at block 144.

As depicted at block 152, an operation is performed which checks an address to determine if this address is included in a list of excluded address profiles, which are specifically illustrated by reference numeral 232 depicted in FIG. 8 herein. If it is determined that this address is not included in the list of excluded address profiles, the process continues and a subsequent operation is performed, as described as block 154. Otherwise, the process continues to block A. As illustrated at block 154, a test is performed to determine whether or not a hesitation factor has been exceeded. An implementation of this operation is specifically depicted in FIG. 8 herein at reference numeral 231 wherein a user controlled option for hesitating a particular number of milliseconds is presented. If this hesitation factor has not been exceeded, then as depicted at block 156, a test is performed to determine whether or not all packets have been received. If not, then the test described at block 154 is performed again. If all packets have been received, then as described at block 158, such packets are displayed and the process then continues to block A.

If the hesitation factor has been exceeded, as depicted at block 154, then as subsequently described at block 160, a test is performed to determine whether actual data received is greater than a completion percent. If so, then the process continues to block A. If not, then as described at block 162, a test is performed to determine if the wait option depicted at numeral 240 in FIG. 8 was switched to the last application displayed or initiated. If so, then as described at block 164, the last application is brought to the foreground and displayed for the user. The process then continues to block A. However, if as described at block 162, the wait option selected was not switched to the last application, then as depicted at block 166, a test is performed to determine whether the wait option selected is equivalent to an application ring. The application ring is essentially a ring of tasks which are systematically brought up at each wait time. This allows the user to monitor several tasks at once while efficiently browsing the web.

If the wait option is equivalent to an application ring, then as illustrated at block 168, a search is performed for the last selected application in the application ring. Then as depicted at block 172, the last application is set to the next selected application in the application ring that is currently running. If such an application does not exist, a null is returned. As described at block 174, if the last application is null, then the process continues to the perform the operation described at block 170. However, if the last application is not null, then as described at block 176, the last current application is brought to foreground and the process then continues to block A. If, as depicted at block 166, the wait option is not equivalent to an application ring, or a next application search produces a null result, then as illustrated at block 170, the browser is minimized and the process continues to block A. These operations, when performed, allow focus to be switched to the next application in the application ring, or leave the last application active if there is not a next application available in the application ring.

Figure 7B:
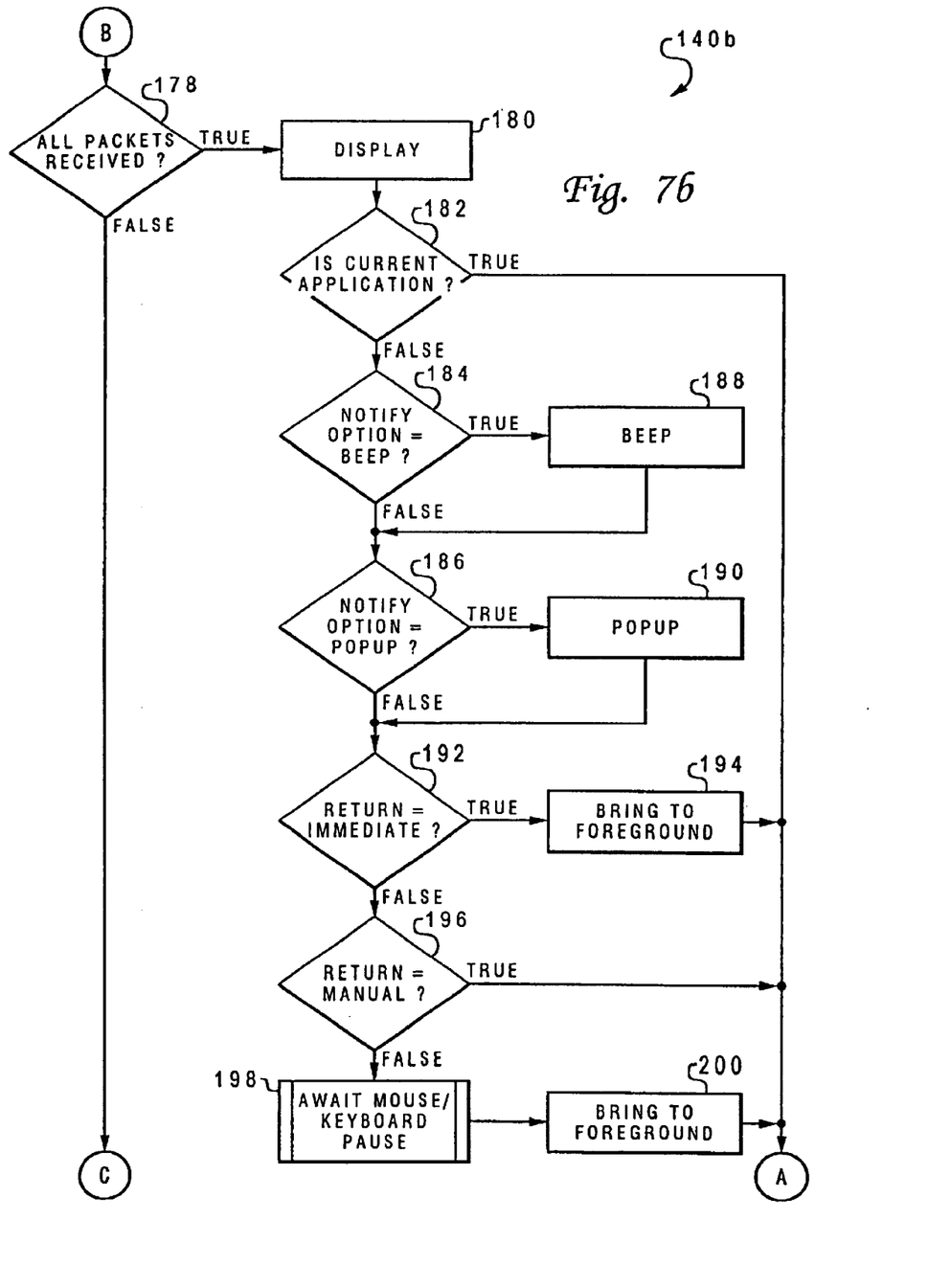
FIG. 7(b) depicts a flow diagram that shows general steps utilized to carry out the method and system, according to a preferred embodiment of the present invention.

FIG. 7(b) depicts a flow diagram 140b that shows general steps utilized to carry out the method and system, according to a preferred embodiment of the present invention. Flow diagram 140b is a continuation of flow diagram 140a. Thus, as depicted at block 178 a test is performed to determine if all packets have been received. If all packets have not been received, then the process continues to block C, which is described in more detail in FIG. 7(c). If all packets have been received, then as illustrated at block 180, the packets are displayed. As depicted at block 182, a test is performed to determine whether or not the displaying application (i.e., the browser) is the current application. If so, then the process continues to A. If not, then as illustrated at block 184 a notify option "beep" test is performed. This notify option "beep" test can be performed by initiating a "beep" notify option, as illustrated at reference numeral 251 in FIG. 8. If a notify "beep" is desired, then as described at block 188, the "beep" is initiated. If the notify "beep" is not invoked, then as illustrated at block 186, a test is performed to determine whether a notify option pop-up (e.g., a "pop-up" window) is desired. Such a notify "pop-up" option is specifically illustrated within FIG. 8 at reference numeral 250.

If so, then as depicted at block 190, the pop-up window is displayed within the graphical user interface in which the browser and simultaneous multi-tasking applications are running. If not, then the process continues, as described at block 192, in which a test is performed to determine if a return option (i.e., refer specifically to return option 260 depicted in FIG. 8) is equivalent to an immediate return option (i.e., refer specifically to immediate return option 261 in FIG. 8). If so, the browser application running at the client workstation is brought to the foreground, as described at block 194. The process then proceeds to A. If not, then as illustrated at block 196, another test is performed. This test determines whether or not the return option (i.e., refer specifically to return option 260 depicted in FIG. 8) is equivalent to a manual return option (i.e., refer specifically to manual return option 262 in FIG. 8). If so, the process continues to A. If not, the system awaits mouse keyboard pause, as depicted at block 198. Following the operation described at block 198, the browser application running at the client workstation is brought to foreground as depicted at block 200. The process then continues to A.

Figure 7C:
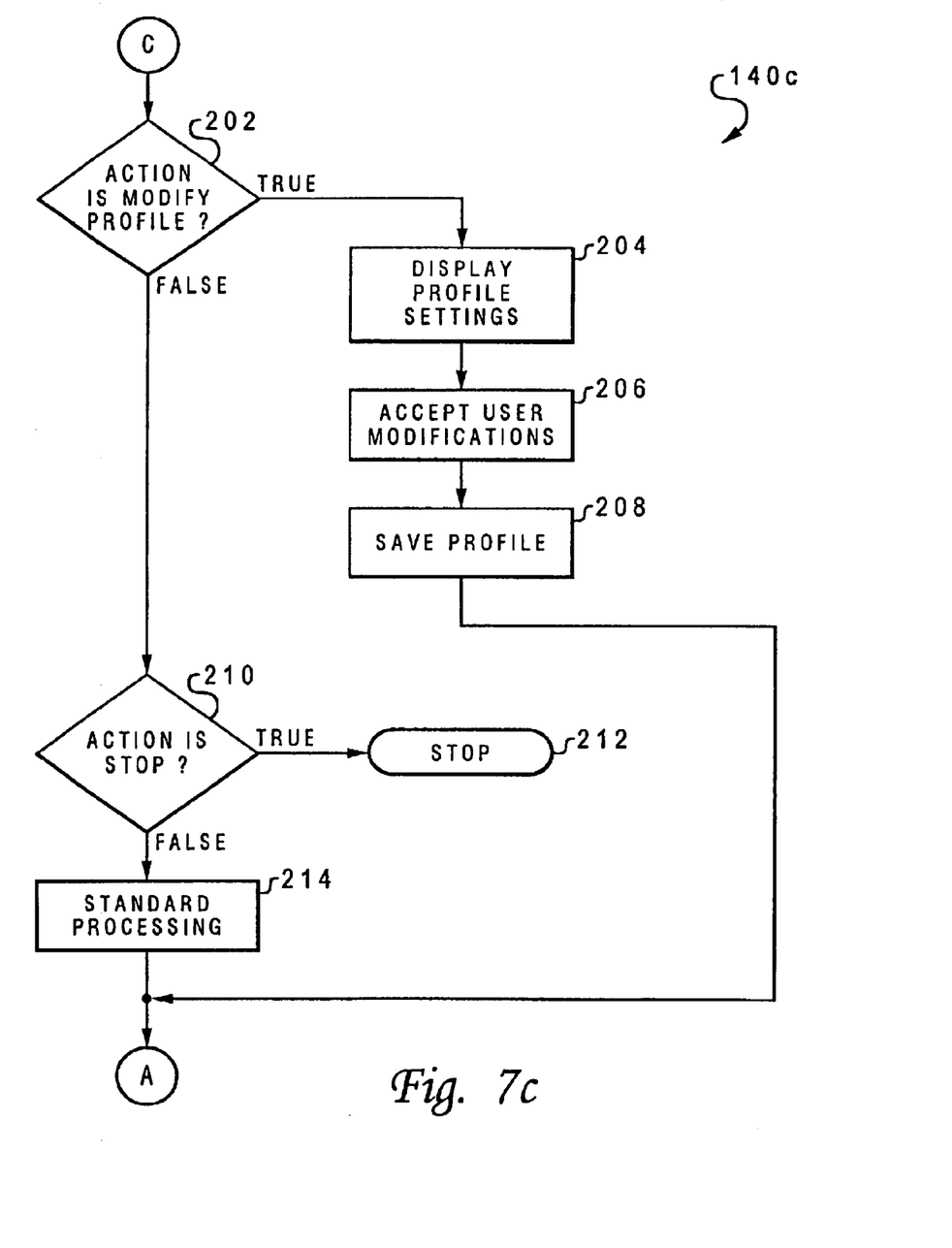
FIG. 7(c) depicts a flow diagram that shows general steps utilized to carry out the method and system, according to a preferred embodiment of the present invention.

FIG. 7(c) depicts a flow diagram 140c that shows general steps utilized to carry out the method and system, according to a preferred embodiment of the present invention. Flow diagram 140c begins at block C and continues from the previous flow diagrams depicted in FIG. 7(a), and FIG. 7(b). As described at block 202, a test is performed to determine whether action is desired to modify the profile. If so, then as described at block 204, profile settings are displayed. Then, as described at block 206, the system accepts user modifications. As illustrated at block 208, the profile is saved and the process then continues to A. However, if action is not taken to modify the profile, then another test is performed, as described at block 210 wherein the action is stopped. Actual implementation of action stoppage is depicted at block 212. If the action is not stopped, then as illustrated at block 214, standard processing continues and then proceeds to A. In essence, the operations performed, as illustrated in FIG. 7(c), result in a message loop.

Figure 7D:
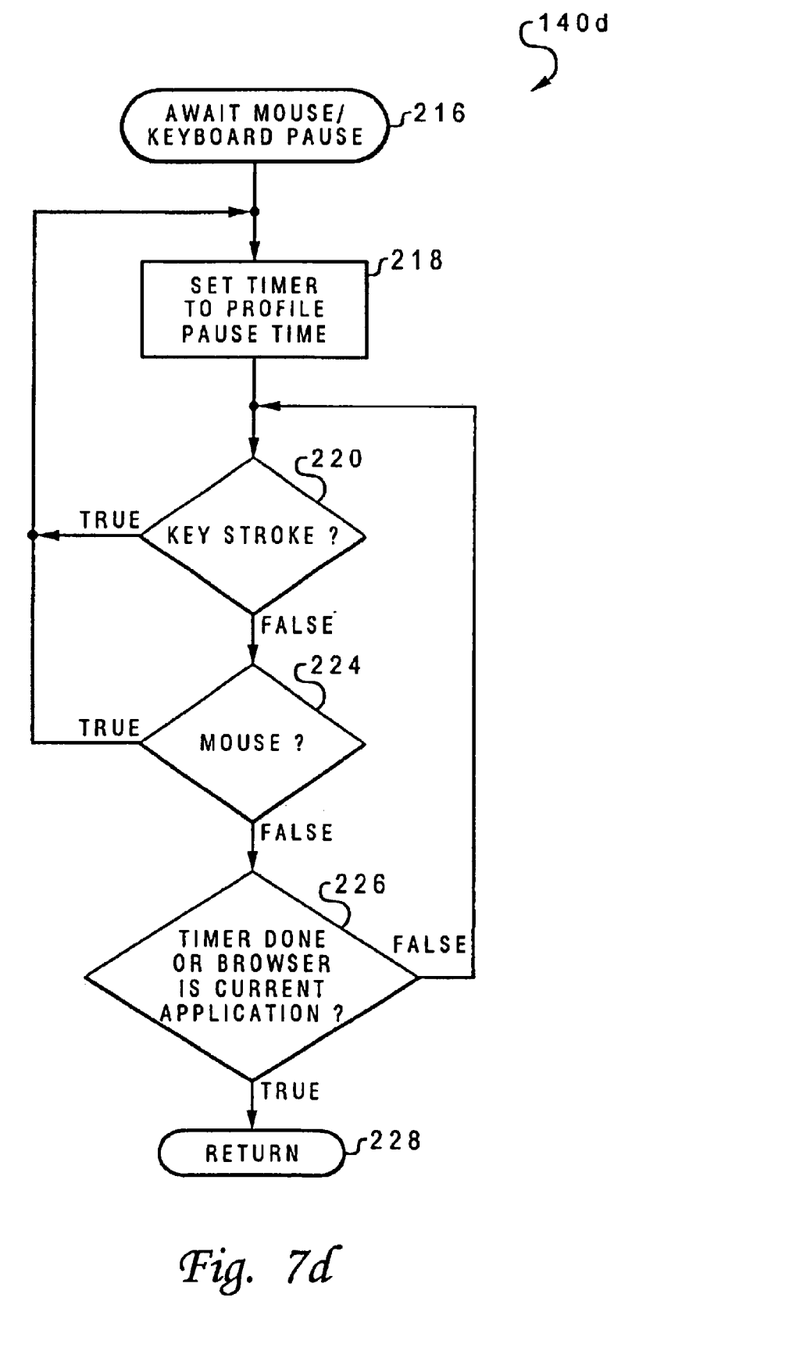
FIG. 7(d) depicts a flow diagram that shows general steps utilized to carry out the method and system, according to a preferred embodiment of the present invention.

FIG. 7(d) depicts a flow diagram 140d that shows general steps utilized to carry out the method and system, according to a preferred embodiment of the present invention. The steps described in FIG. 7(d) specifically describe in greater detail the operation described in block 198 of FIG. 7(b), "Await Mouse Keyboard Pause." Thus, as described at block 216, an operation is performed in which the system waits for a mouse keyboard pause. As illustrated at block 218, a time is set to the profile pause time (i.e., refer specifically to profile pause time 263 depicted in FIG. 8). As illustrated at block 220, if a key stroke occurs, the operation performed, as described at block 218, is repeated resetting the timer. However, if a key stroke does not occur, then as illustrated at block 224, if mouse input occurs, the operation performed, as illustrated at block 218, is repeated resetting the timer. As described at block 226, a test is performed to determine whether or not the timer is complete. If so, or if the browser is the current application, then as illustrated at block 228, the process returns to perform the operation described at block 200 in FIG. 7(b). If not, then the operations illustrated at block 220 and 224 are repeated, effectively waiting until a pause is available prior to returning and processing the operation illustrated at block 200.

Figure 8:
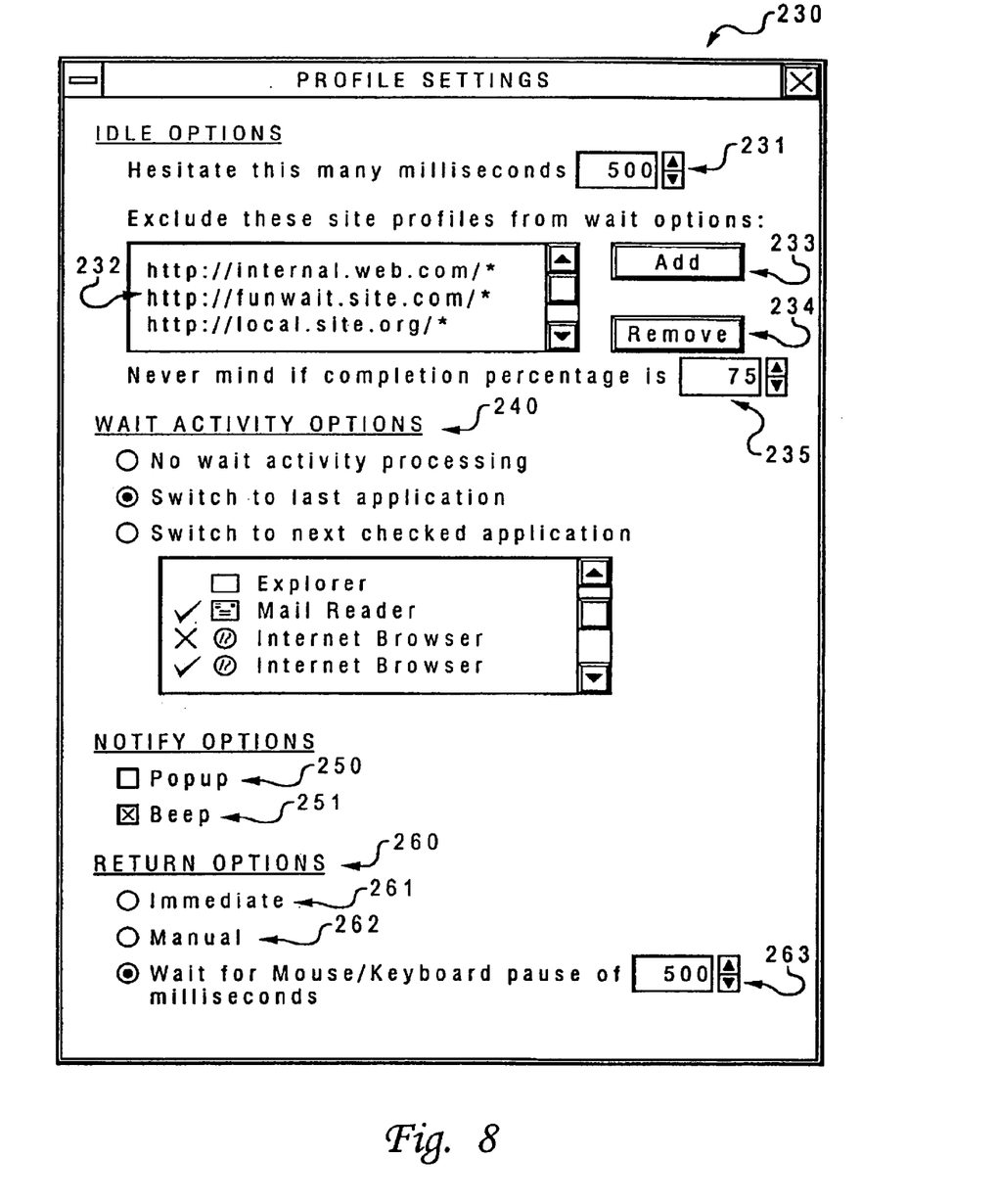
FIG. 8 is a window which is utilized in association with a browser application, according to a preferred embodiment of the present invention.

FIG. 8 is a window 230 which is utilized in association with a browser application, according to a preferred embodiment of the present invention. Window 230 is displayed within a graphical user interface window, similar to window 104 depicted in FIG. 6. Window 230 allows a user to maintain and alter profile settings for the swapping method and system depicted herein. For example, window 230 includes "Idle Options" that allow a user to designate a hesitation period as indicated at reference numeral 231, and exclude particular web sites (e.g., URLs depicted at reference numeral 232) from wait options. Graphical buttons "add" 233 and "remove" 234 allow a user to include and exclude the URL profiles referred to by reference numeral 232 from the wait options. In addition, as depicted at reference numeral 235, a user can initiate a setting which overrides the idle options if a particular percentage of the application loading is already complete.

Other parameters that may be altered by the user within window 230 include wait activity options 240, and notify options that can also be altered by the user via window 230. For example, the user may designate, as depicted at reference numeral 250, whether notification may be indicated via a "pop-up" secondary window or simply by a "beep" signal as indicated at reference numeral 251. Return options 260 include an immediate return option 261, a manual return option 262, and as depicted at reference numeral 263, a time period setting in which to wait for a mouse/keyboard pause. Utilizing such profile settings, provision can be made to wait a number of seconds before swapping applications, thus allowing for small waits. Although not specifically depicted within window 230, those skilled in the art will appreciate that other profile settings may be provided in accordance with a preferred embodiment of the present invention. For example, provision can be made to disallow swapping for certain applications or during certain times of the day. Provisions can also be made to distinguish between local (i.e., immediate) links and distant (i.e., time consuming) links, and to inactivate swapping for local links.

The embodiments and examples set forth herein are presented in order to best explain the present invention and its practical application and, thereby, to enable those skilled in the art to make and use the invention. However, those skilled in the art will recognize that the foregoing description and examples have been presented for the purposes of illustration and example only. The description as set forth is not intended to be exhaustive or to limit the invention to the precise form disclosed. Many modifications and variations are possible in light of the above teaching without departing from the spirit and scope of the following claims.

What is claimed is:

1. A method for automatically swapping application tasks running within a local network site of a computer network when access from said local network site to a remote network site is delayed, said method comprising:

initiating, from a communications application at a local network site, a link to a remote network site while multi-tasking applications are simultaneously running at said local network site;

initiating retrieval of data from said remote network site, in response to initiating said link;

automatically switching focus from said communications application to one said multi-tasking applications, in response to initiating said link;

determining, after focus has been switched from said communications application, that said data has been retrieved; and     automatically providing user notification that said data has been retrieved, in response to said determination.

2. The method of claim 1, wherein said step of automatically providing user notification comprises automatically switching focus back to said communications application from said one of said multi-tasking applications.

3. The method of claim 2, wherein:

said method further comprises detecting expiration of a predetermined period of time in which no user input has been received; and said step of switching focus back to said communications application is performed only after said step of detecting said expiration.

4. The method of claim 1, further comprising:

receiving user input selecting said communications application after said notification has been provided; and switching focus back to said communications application from said multi-tasking application in response to receipt of said user input.

5. The method of claim 1, wherein:

said method further comprises identifying a previously utilized application among said multi-tasking applications; and said step of automatically switching focus to said multi-tasking application comprises automatically switching focus to said previously utilized application.

6. The method of claim 1, wherein:

said method further comprises consulting a ring of applications to identify a selected application among said ring and among said multi-tasking applications; and said step of automatically switching focus to said multi-tasking application comprises automatically switching focus to said identified application.

7. The method of claim 1, wherein:

said method further comprises determining whether said link is a time-consuming link, based on a location of said remote network site; and said step of automatically switching focus to said multi-tasking application is performed only if said link is determined to be a time consuming link.

8. A system for automatically swapping application tasks running within a local network site of a computer network when access from said local network site to a remote network site is delayed, said system comprising:

a local network site including processing resources, memory operatively linked to said processing resources, and a communications facility operatively linked to said processing resources;

a communications application, running in said processing resources, that initiates a link to a remote network site via said communications facility while multi-tasking applications are simultaneously running at said local network site;

means for initiating retrieval of data from said remote network site, in response to initiating said link;

means for automatically switching focus from said communications application to one of said multi-tasking applications, in response to initiating said link;

means for determining, after focus has been switched from said communications application, that said data has been retrieved; and means for automatically providing user notification that said data has been retrieved, in response to said determination.

9. A system according to claim 8, wherein said means for automatically providing user notification comprises means for automatically switching focus back to said communications application from said one of said multi-tasking applications.

10. A system according to claim 9, wherein:

said system further comprises means for detecting expiration of a predetermined period of time in which no user input has been received; and said means for automatically switching focus back to said communications application operates only after said expiration is detected.

11. A system according to claim 8, further comprising:

means for receiving user input selecting said communications application after said notification has been provided; and means for switching focus back to said communications application from said multi-tasking application in response to receipt of said user input.

12. A system according to claim 8, wherein:

said system further comprises means for identifying a previously utilized application among said multi-tasking applications; and said means for automatically switching focus to said multi-tasking application comprises means for automatically switching focus to said previously utilized application.

13. A system according to claim 8, wherein:

said system further comprises means for consulting a ring of applications to identify a selected application among said ring and among said multi-tasking applications; and said means for automatically switching focus to said multi-tasking application comprises means for automatically switching focus to said identified application.

14. A system according to claim 8, wherein:

said system further comprises means for determining whether said link is a time-consuming link, based on a location of said remote network site; and said means for automatically switching focus to said multi-tasking application operates only if said link is determined to be a time consuming link.

15. A program product for automatically swapping application tasks running within a local network site of computer network when access from said local network site to a remote network site is delayed, said program product comprising:

a communications application that initiates a link to a remote network site while multi-tasking applications are simultaneously running at said local network site;

means for initiating retrieval of data from said remote network site, in response to initiating said link;

means for automatically switching focus from said communications application to one of said multi-tasking applications, in response to initiating said link;

means for determining, after focus has been switched from said communications application, that said data has been retrieved; and means for automatically providing user notification that said data has been retrieved, in response to said determination; and a computer usable medium encoding said communications application, said means for initiating retrieval of data, said means for automatically switching focus from said communications application, said means for determining, and said means for automatically providing user notification.

16. A program product according to claim 15, wherein said means for automatically providing user notification comprises means for automatically switching focus back to said communications application from said one of said multi-tasking applications.

17. A program product according to claim 16, wherein:

said computer usable medium further encodes means for detecting expiration of a predetermined period of time in which no user input has been received; and said means for automatically switching focus back to said communications application operates only after said expiration is detected.

18. A program product according to claim 15, wherein said computer usable medium further encodes:

means for receiving user input selecting said communications application after said notification has been provided; and means for switching focus back to said communications application from said multi-tasking application in response to receipt of said user input.

19. A program product according to claim 15, wherein:

said computer usable medium further encodes means for identifying a previously utilized application among said multi-tasking applications; and said means for automatically switching focus to said multi-tasking application comprises means for automatically switching focus to said previously utilized application.

20. A program product according to claim 15, wherein:

said computer usable medium further encodes means for consulting a ring of applications to identify a selected application among said ring and among said multi-tasking applications; and said means for automatically switching focus to said multi-tasking application comprises means for automatically switching focus to said identified application.

21. A program product according to claim 15, wherein:

said computer usable medium further encodes means for determining whether said link is a time-consuming link, based on a location of said remote network site; and said means for automatically switching focus to said multi-tasking application operates only if said link is determined to be a time consuming link.

* * * * *